United States Patent
Geiberger et al.

(10) Patent No.: US 8,627,735 B2
(45) Date of Patent: Jan. 14, 2014

(54) TRANSMISSION SHIFT DEVICE

(75) Inventors: Axel Geiberger, Mainz (DE); Thorsten Hahn, Gau-Odernheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 203 days.

(21) Appl. No.: 13/331,714

(22) Filed: Dec. 20, 2011

(65) Prior Publication Data

US 2012/0186377 A1    Jul. 26, 2012

(30) Foreign Application Priority Data

Dec. 21, 2010 (DE) .......................... 10 2010 055 446

(51) Int. Cl.
*F16H 3/08* (2006.01)
*B60K 20/00* (2006.01)

(52) U.S. Cl.
USPC .......................... 74/325; 74/476.36

(58) Field of Classification Search
USPC ........................ 74/325, 335, 473.36
See application file for complete search history.

(56) References Cited

U.S. PATENT DOCUMENTS

| | | | | |
|---|---|---|---|---|
| 4,852,421 A | * | 8/1989 | Kerboul | 74/473.21 |
| 5,146,806 A | * | 9/1992 | Doster et al. | 74/473.26 |
| 5,224,393 A | * | 7/1993 | Ashikawa et al. | 74/337.5 |
| 5,542,309 A | * | 8/1996 | Wenger et al. | 74/337.5 |
| 5,590,563 A | * | 1/1997 | Kuwahata et al. | 74/337.5 |
| 6,003,649 A | | 12/1999 | Fischer et al. | |

FOREIGN PATENT DOCUMENTS

| | | |
|---|---|---|
| DE | 19713423 A1 | 11/1997 |
| DE | 19823767 A1 | 12/1998 |
| DE | 19835736 A1 | 2/2000 |
| DE | 10153926 A1 | 5/2003 |
| DE | 10155519 A1 | 5/2003 |
| DE | 102006007592 A1 | 8/2007 |
| DE | 102006024627 A1 | 11/2007 |
| GB | 2325967 A | 12/1998 |

* cited by examiner

*Primary Examiner* — Ha D Ho
(74) *Attorney, Agent, or Firm* — Ingrassia Fisher & Lorenz, P.C.

(57) ABSTRACT

A transmission shift device is provided that includes, but is not limited to a shifting shaft, which is mounted so it is axially immovable and rotatable in a transmission shift housing and is mechanically connected to a shift lever. Furthermore, the transmission shift device includes, but is not limited to a selector lever, which is mounted so it is axially displaceable on the shifting shaft and is mechanically connected to a selector lever. The selector lever is held in a spring-elastic manner in a middle axial selection position on the shifting shaft by at least one spring element.

13 Claims, 4 Drawing Sheets

TRANSMISSION SHIFT DEVICE

CROSS-REFERENCE TO RELATED APPLICATION

This application claims priority to German Patent Application No. 102010055446.4, filed Dec. 21, 2010, which is incorporated herein by reference in its entirety.

TECHNICAL FIELD

The technical field relates to a transmission shift device for a shift transmission. The transmission shift device has a transmission shift housing, from which a selector lever and a shift lever of the shift transmission protrude. A shifting shaft, which is mounted in the transmission shift housing, is mechanically connected to the shift lever.

BACKGROUND

Transmission shift devices are known, in which the actuation of the shift lever triggers a rotational movement of the shifting shaft, and the actuation of the selector lever triggers a displacement of a selector sleeve arranged in a rotationally fixed manner on the shifting shaft. In order to hold the selector sleeve in a neutral position, locking devices having detent balls and corresponding detent contours are known, as described, for example, in DE 198 35 736 A1.

At least one embodiment is to provide a transmission shift device, in which the shifting feel is improved by a reduction of the friction acting during shifting and/or selection. In addition, other objects, desirable features, and characteristics will become apparent from the subsequent summary and detailed description, and the appended claims, taken in conjunction with the accompanying drawings and this background.

SUMMARY

According to an embodiment, a transmission shift device is provided, which has a shifting shaft, which is mountable or mounted in a transmission shift housing so it is axially immovable and rotatable and is mechanically connected to a shift lever. The transmission shift device also has a selector sleeve, which is mounted so it is axially displaceable on the shifting shaft and is mechanically connected to a selector lever. The selector lever has shifting fingers to engage with a shifting fork and is held in a spring-elastic manner in a middle axial selection position on the shifting shaft by at least one spring element.

By the spring-elastic mounting of the selector sleeve in relation to the shifting shaft, a gearshift lever arranged in the vehicle interior is rebounded into a neutral channel of a shifting gate in a middle selection position for middle gearshift pairs. Therefore, the gearshift lever returns to this neutral position. Through the spring-elastic mounting of the selector lever, the shifting feel is improved in that the high friction that occurs upon use of a lock is dispensed with. The shifting feel is accordingly refined by dispensing with the detent, on the one hand, and becomes more effortless as a whole due to the reduction of the acting friction forces, on the other hand.

According to an embodiment, a first coil spring and a second coil spring are provided as spring elements, which enclose the shifting shaft diametrically opposite to one another and are arranged on the shifting shaft. The first coil spring can be supported at a first end on a first outer ring and the second coil spring can be supported at a second end on a second outer ring, the first and the second outer rings being fixed axially immovably on the shifting shaft.

For a first selection position, the spring force of the restoring first coil spring is to be overcome, in order to be able to engage a first forward gear V1 or a second forward gear V2 in the corresponding shift channel of the shifting gate, for example. At the moment, no gear is engaged and the gearshift lever is freely movable in the neutral channel, the gearshift lever in the interior of the vehicle is rebounded in a spring-elastic manner into a middle selection position in the neutral channel of the shifting gate because of the spring-elastic mounting of the selector lever of the transmission shift device.

Therefore, for example, the third and fourth forward gears V3 and V4 of a six-gear transmission can be engaged without the use of force. For higher gears, for example, the fifth or sixth forward gear V5 or V6, the restoring force of a second coil spring in the transmission shift device is to be overcome in order to move the gearshift lever and therefore the selector lever into a third selection position in the transmission shift device. Thus, for example, the gear gearwheel pair of a fifth forward gear V5 and/or a sixth forward gear V6 and/or a reverse gear R is engaged. Through the arrangement of the coil springs in the axial direction of the axially fixed shifting shaft, it is possible to shorten this shifting shaft, since previously typical locking aids that can be snapped for axial positioning of the shifting shaft are dispensed with. By shortening the shifting shaft, a weight savings of the transmission shift device is simultaneously also possible.

According to an embodiment, the selector sleeve has a first inner ring protruding radially inward and a second inner ring protruding radially outward, on which a second end of the first coil spring or a second end of the second coil spring is supported, respectively, and hold the selector sleeve mounted in a spring-elastic manner in the middle axial selection position. These inwardly protruding first and second inner rings of the selector sleeve can be simple snap rings, which can be snapped into corresponding grooves of the inner walls of the selector sleeve. The selector sleeve is therefore pre-tensioned in a spring-elastic manner in the axial direction on the shifting axis, the pre-tension of the two coil springs being selected so that the selector sleeve is held in a spring-elastic manner in a middle axial selection position by the coil springs.

According to an embodiment, the shifting shaft has a tappet, which is axially displaceable relative to the selector sleeve and carries along the selector sleeve upon a rotation of the shifting shaft. To allow axially displaceable mounting of the selector sleeve on the axially fixed shifting shaft, two needle bearings are provided on the shifting shaft according to one embodiment. In order to additionally fix the shifting shaft itself in the axial direction, it can be provided that the shifting shaft is mounted so it is axially immovable and rotatable in the transmission shift housing in at least one axially fixed roller ball bearing. The second bearing can again be implemented as a needle bearing. This further needle bearing for mounting the shifting shaft is preferably supported on a shift transmission housing.

According to a further embodiment, a shift transmission is provided, which has the described transmission shift device. According to another embodiment, the selector sleeve has two shifting fingers, which access a shifting shaft, which engages corresponding gear gearwheel pairs of the shift transmission, in the axial selection positions of the selector sleeve of the transmission shift device upon pivoting of the shifting shaft. Middle gear gearwheel pairs of the shift transmission can be assigned to the middle axial selection position of the selector sleeve.

According to an embodiment, the selector sleeve is axially displaceable from the middle selection position into a first selection position on the shifting shaft under spring-elastic compression of the first coil spring, the first selection position being assigned to first gear gearwheel pairs of the shift transmission. In addition, the selector sleeve can be axially displaceable from the middle selection position into a third selection position on the shifting shaft under spring-elastic compression of the second coil spring, the third selection position being assigned to third gear gearwheel pairs.

In this embodiment, three different selection positions for the selector sleeve therefore result: The first selection position, which is assigned to first gear gearwheel pairs of the shift transmission, the middle or second selection position, which is assigned to second gear gearwheel pairs of the shift transmission, and the third selection position, which is assigned to third gear gearwheel pairs of the shift transmission.

A further embodiment provides that the selector lever for selecting gear gearwheel pairs and the shift lever for engaging a gear of a shift transmission each cooperate with a tension/compression cable, which transmits shifting forces of a gearshift lever, which is arranged in a vehicle interior, to the shift transmission of a vehicle.

According to an embodiment, a motor vehicle is provided having the described shift transmission.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
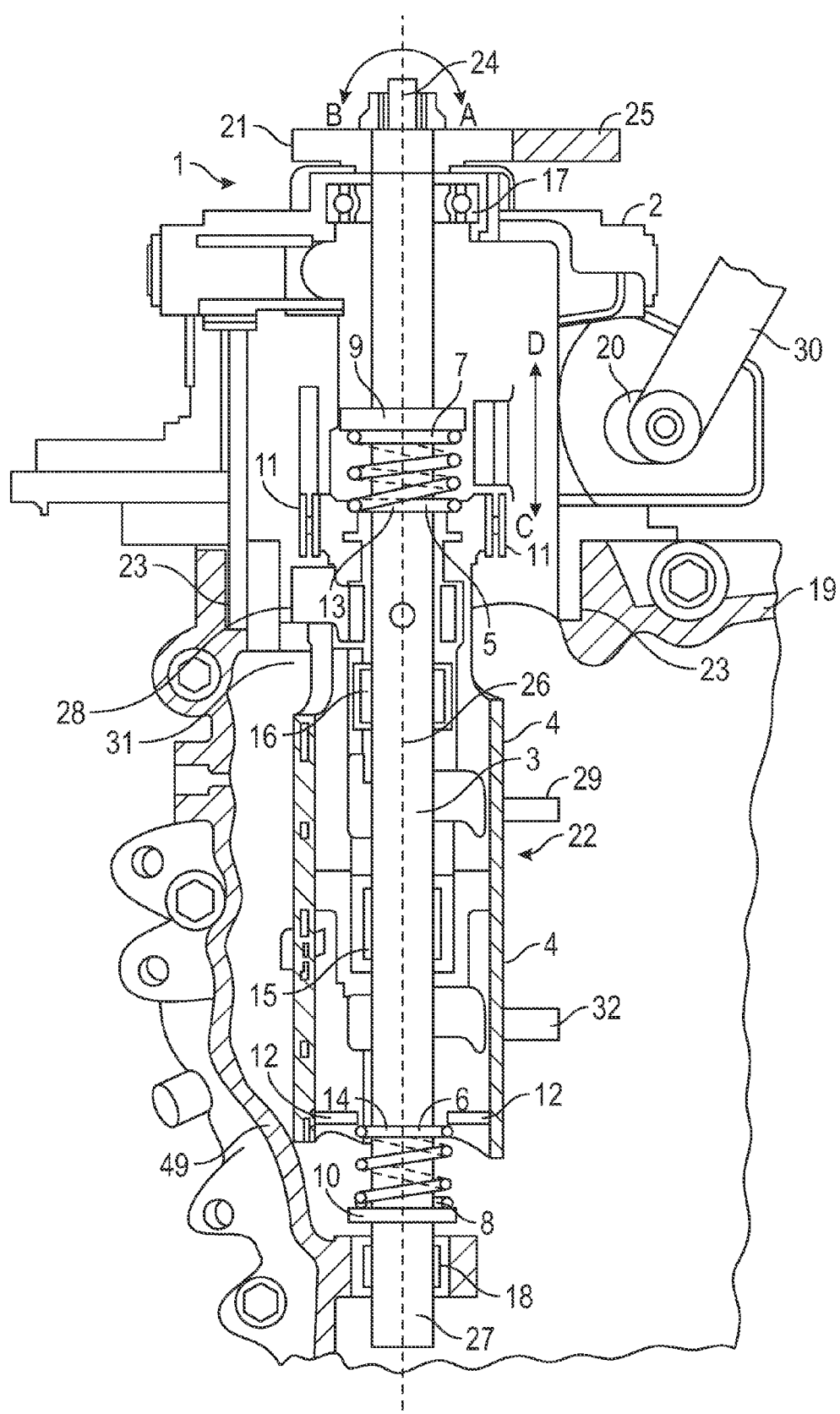
FIG. 1 schematically shows a partial section through a transmission shift device according to an embodiment.

FIG. 1 shows a transmission shift device 1 having a transmission shift housing 2, which is insertable into an opening 23 of a shift transmission housing 19. A shifting shaft 3 is centrally mounted so it is rotatable in the transmission shift housing 2 and has a shift lever attachment 21 on an outer end 24. A shift lever 25 is arranged on the shift lever attachment 21, whose actuation is described in greater detail based on FIG. 3.

In the area of the outer end 24 of the shifting shaft 3, it is mounted so it is rotatable by means of a roller ball bearing 17, which is arranged axially fixed, and is supported on the transmission shift housing 2. The shifting shaft 3 is mounted in a needle bearing 18, which is arranged in the shift transmission housing 19, in the area of an inner end 27. A selector sleeve 4 is mounted so it is axially displaceable on the shifting shaft 3 in needle bearings 15 and 16 or friction bearings, which are supported on the shifting shaft 3.

Figure 2:
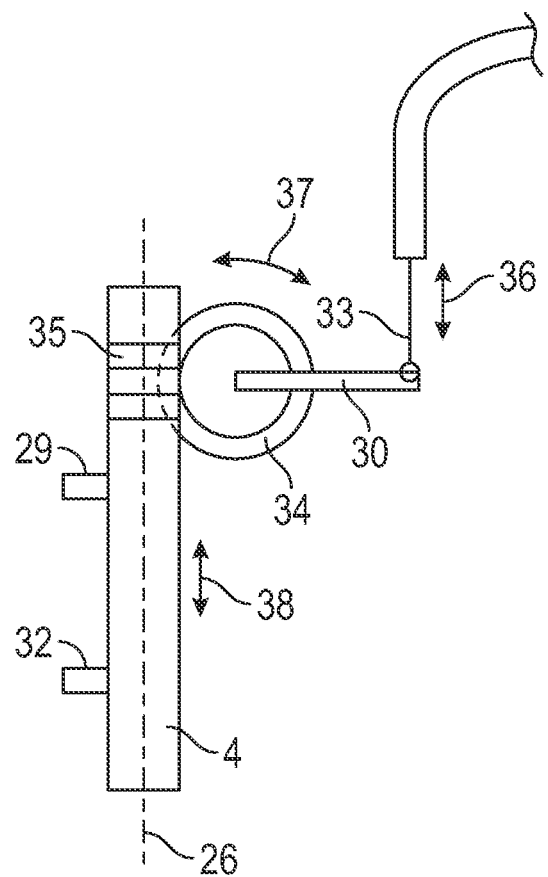
FIG. 2 schematically shows the mode of operation of the selector lever of the transmission shift device according to FIG. 1.

The selector sleeve 4 is located in the position shown in FIG. 1 in an axial middle selection position 22 and is held in a spring-elastic manner in this middle selection position 22 by two diametrically opposite spring elements, which enclose the shifting shaft 3, and are implemented as coil springs 5 and 6. Both coil springs 5 and 6 may be relieved in this middle selection position. A selector lever 30, which is shown in greater detail in FIG. 2, is provided on a selector lever attachment 20.

Each of the two coil springs 5 or 6 is supported at a first end 7 or 8 on an outer ring 9 or 10, respectively, which is fixed in an axially-fixed and rotationally-fixed manner on the shifting shaft 3 and concentrically thereto. The coil spring 5 or 6 is supported at a second end 13 or 14 on an inner ring 11 or 12, respectively, of the selector sleeve 4, which is thus held axially in a spring-elastic manner by the two coil springs 5 and 6. The inner rings 11 or 12 are fixed on an inner wall of the selector sleeve 4 and transmit the spring pressure of the coil springs 5 and 6 to the selector sleeve 4. Instead of the inner rings 11 or 12, ring-shaped shoulders can also be provided on the inner wall of the selector sleeve 4, on which the coil springs 5 or 6 are supported.

The selector sleeve has two shifting fingers 29, 32 arranged fixedly thereon. A slot 31 extending essentially in the axial direction is arranged in the outer side of the selector sleeve 4. A tappet 28, which is fixedly connected to the shifting shaft 3, engages in this slot 31. This is shown in detail in FIG. 5 and FIG. 6. In operation, the shifting shaft 3 is pivotable by means of the shift lever 25 around the axis 26 of the shifting shaft 3, the shifting shaft 3 not being displaceable in the axial direction.

To select a gear, the selector sleeve 4 can be axially displaced with the aid of the selector lever 30 arranged in the selector lever attachment 20 from the axial middle selection position 22 shown in FIG. 1 in the arrow directions C and D. One of the coil springs 5 or 6 of the transmission shift device 1, for example, the first coil spring 5, is relieved, and the diametrically opposite coil spring 6 is pre-tensioned more strongly.

Through the displacement of the selector sleeve 4, the shifting fingers 29, 32 arranged fixedly thereon are also displaced in the axial direction. The shifting shaft 3 is not axially displaced and the selector sleeve 4 slides along it, the tappet 28 moving in the slot 31 in the axial direction. The shifting fingers 29, 32 are thus moved into an axial selection position.

To shift into a selected gear, the shifting shaft 3 is rotated with the selector lever 25 around its axis 26. The tappet 28 carries along the selector sleeve 4, which therefore also rotates around its longitudinal axis. The shifting fingers 29, 32 are therefore rotated and at least one of the shifting fingers 29, 32 engages with a shifting fork 48 shown in FIG. 4. If the selector lever 30 is released, the selector sleeve 4 rebounds into the axial middle selection position 22. Therefore, at least three selection positions can be provided, namely a first selection position in the arrow direction C, an axial middle selection position 22, as shown in FIG. 1, and a third selection position in the arrow direction D. In six-gear transmissions, a fourth selection position can additionally be provided for the reverse gear.

FIG. 2 shows an example of a mechanism for actuating the selector sleeve 4. One end of the selector lever 30 is connected to a cable pull 33, which can be actuated by a gearshift lever, and the other end is connected to the axis of a gearwheel 34. The gearwheel 34 engages in teeth 35 on the outer side of the selector sleeve 4. By actuating the cable pull 33 in the direction of the arrow 36, a rotation of the gearwheel 34 in the direction of the arrow 37 and thus a movement of the selector sleeve 4 in the direction of the arrow 38 is caused.

Figure 3:
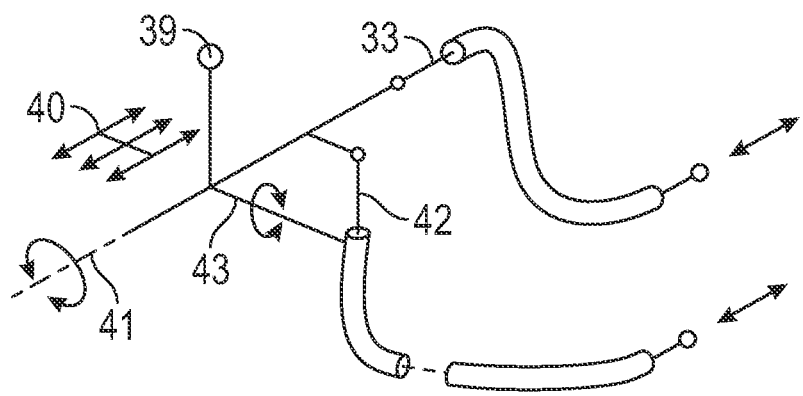
FIG. 3 schematically shows a gearshift lever having connections to the transmission shift device according to FIG. 1.

FIG. 3 schematically shows a gearshift lever 39 arranged in the vehicle interior, which may be moved inside a shifting gate 40. The gearshift lever 39 can be pivoted around the axis 41 to select a gear, whereby the cable pull 33 is actuated. Pivoting around the axis 43 to shift into a selected gear causes the actuation of the further cable pull 42, which actuates the shifting shaft 3 of the transmission shift device 1.

Figure 4:
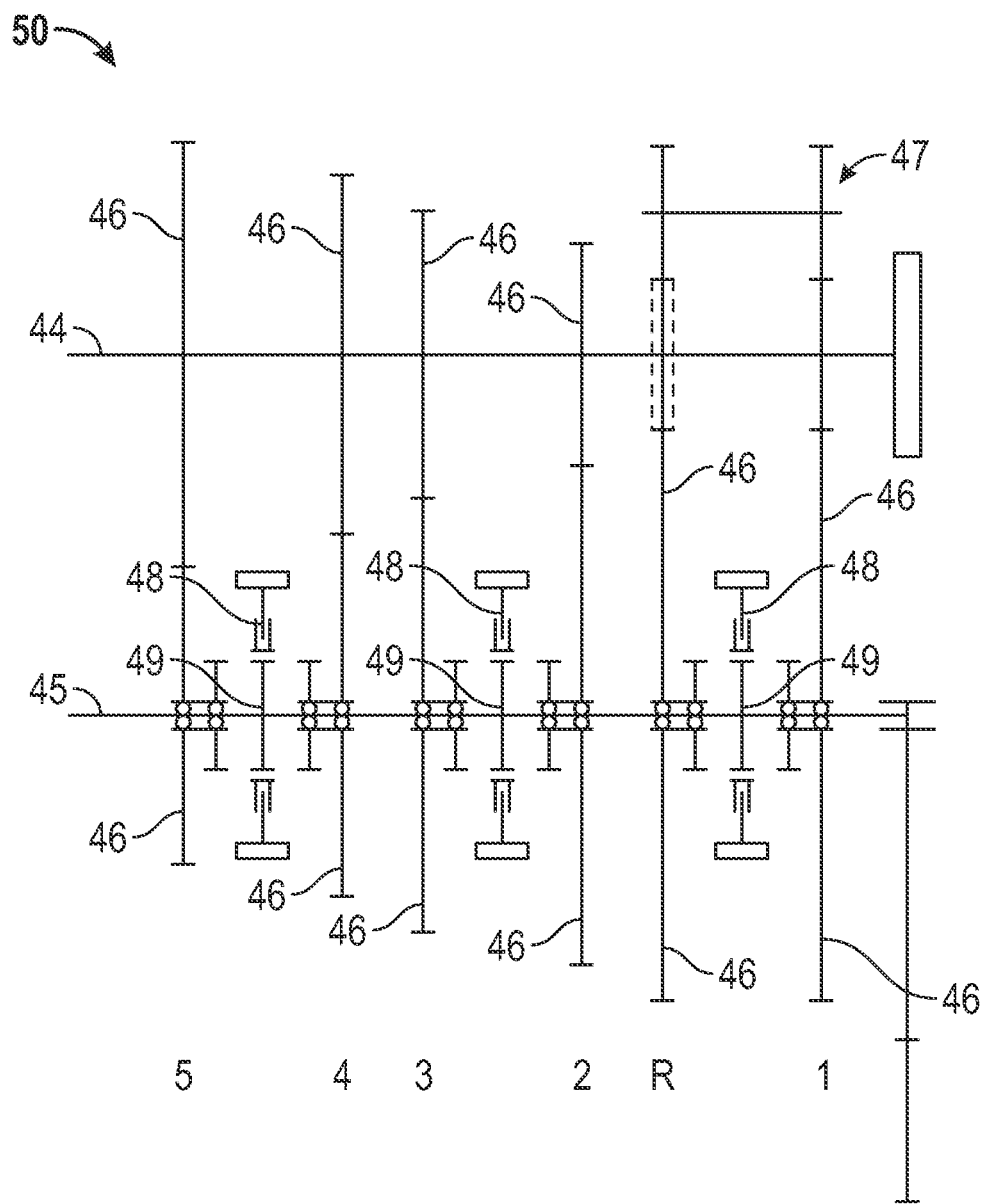
FIG. 4 schematically shows an embodiment of a shift transmission, which is shiftable with the transmission shift device according to FIG. 1.

FIG. 4 schematically shows a possible embodiment of a shift transmission as a six-gear transmission, which is shiftable by means of the transmission shift device 1 according to FIG. 1. The shift transmission transmits the engine torque via an input shaft 44 and an auxiliary shaft 45 to the differential 50. Six gear gearwheels 46 are arranged in each case on the input shaft 44 and on the auxiliary shaft 45. A sliding clutch 49, which can be actuated via a shifting fork 48, is arranged between each two gearwheels 46 on the auxiliary shaft 45. The shifting forks 48 are moved to the right or left on the selector sleeve 4 upon shifting by the shifting fingers 29, 32 and correspondingly displace the sliding clutches 49. These are thus each engaged with a gear gearwheel 46 on the auxiliary shaft 45 and therefore connect it to the auxiliary shaft 45.

Figure 5:
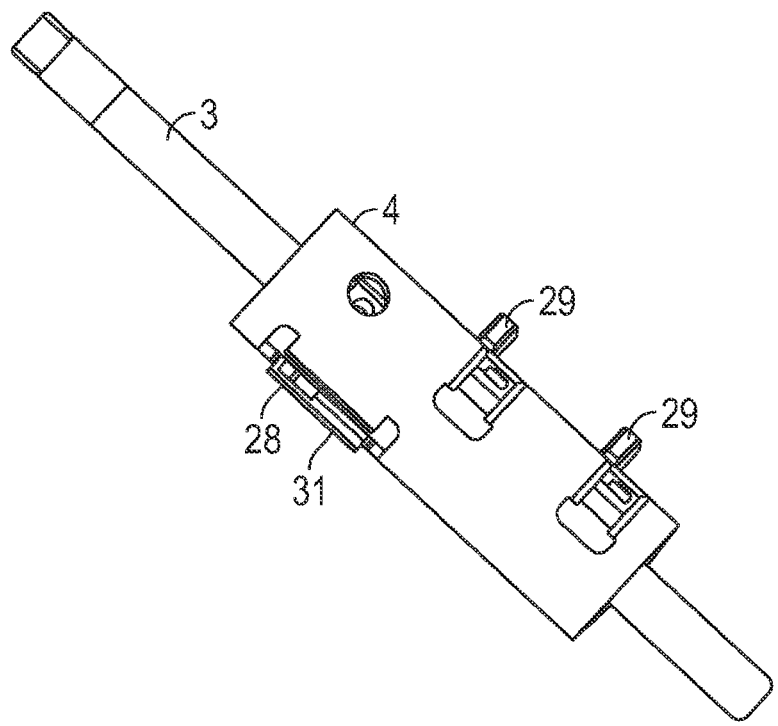
FIG. 5 schematically shows a perspective view of a shifting shaft of the transmission shift device according to FIG. 1.

FIG. 5 schematically shows the tappet 28 arranged on the shifting shaft 3. The tappet 28 is connected to the shifting shaft 3 so it is rotationally fixed and axially immovable. It therefore forms a part of the shifting shaft 3 and is also pivoted upon a rotation of the shifting shaft 3.

Figure 6:
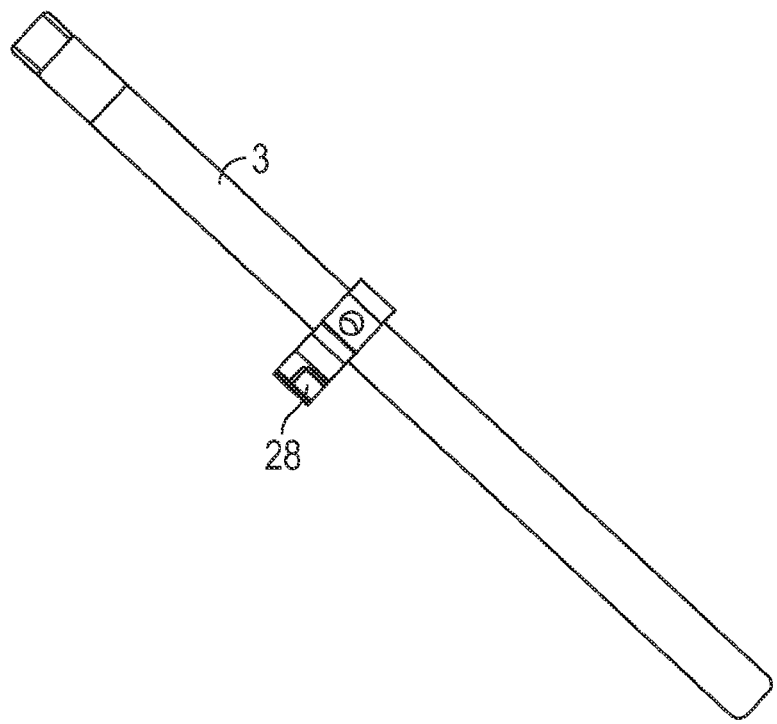
FIG. 6 schematically shows a perspective view of the shifting shaft according to FIG. 5 having a selector lever.

FIG. 6 schematically shows the shifting shaft 3 according to FIG. 2 having the selector sleeve 4 also arranged thereon. The tappet 28 comes to rest in the selector sleeve 4 in the slot 31 extending in the axial direction. During a rotation of the shifting shaft 3, the tappet 28 carries along the selector sleeve 4, so that it rotates with the shifting shaft 3. During a movement of the selector sleeve 4 in the axial direction, in contrast, the slot 31 allows an axial displacement of the selector sleeve 4 without a corresponding axial displacement of the shifting shaft 3.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A transmission shift device, comprising:
   a transmission shift housing;
   a shift lever;
   a shifting fork;
   a shifting shaft mounted for axial immovability and rotatable in the transmission shift housing and mechanically connected to the shift lever;
   a selector sleeve mounted for axial displaceability on the shifting shaft and is mechanically connected to a selector lever, the selector sleeve comprising a plurality of shifting fingers configured to engage with the shifting fork; and
   a spring element configured to hold the selector sleeve in a spring-elastic manner in a middle axial selection position on the shifting shaft.

2. The transmission shift device according to claim 1, further comprising a first coil spring and a second coil spring configured as spring elements that enclose the shifting shaft diametrically opposite to one another and arranged on the shifting shaft.

3. The transmission shift device according to claim 2,
   wherein the first coil spring is supported at a first end on a first outer ring and the second coil spring is supported at a second end on a second outer ring, and
   wherein the first outer ring and the second outer ring are fixed for axial immovability on the shifting shaft.

4. The transmission shift device according to claim 2,
   wherein the selector sleeve comprises a first inner ring protruding radially inward on which a second end of the first coil spring is supported and holds the selector sleeve mounted in the spring-elastic manner in the middle axial selection position.

5. The transmission shift device according to claim 2,
   wherein the selector sleeve comprises a first inner ring protruding radially inward on a second end of the second coil spring is supported and holds the selector sleeve mounted in the spring-elastic manner in the middle axial selection position.

6. The transmission shift device according to claim 1, wherein the shifting shaft comprises a tappet that is axially displaceable relative to the selector sleeve and carries along the selector sleeve during a rotation of the shifting shaft.

7. The transmission shift device according to claim 1, further comprising two needle bearings configured for an axially displaceable mounting of the selector sleeve that are arranged between the selector sleeve and the shifting shaft.

8. A shift transmission, comprising:
   gear gearwheel pairs; and
   a transmission shift device, comprising:
      a transmission shift housing;
      a shift lever;
      a shifting fork;
      a shifting shaft mounted for axial immovability and rotatable in the transmission shift housing and mechanically connected to the shift lever;
      a selector sleeve mounted for axial displaceability on the shifting shaft and is mechanically connected to a selector lever, the selector sleeve comprising a plurality of shifting fingers configured to engage with the shifting fork; and
      a spring element configured to hold the selector sleeve in a spring-elastic manner in a middle axial selection position on the shifting shaft,
   wherein the plurality of shifting fingers are configured to access the shifting fork that brings the gear gearwheel pairs of the shift transmission into engagement upon a pivot of the shifting shaft.

9. The shift transmission according to claim 8,
   wherein the shift transmission is a six-gear transmission, and
   wherein the selector sleeve has two shifting fingers.

10. The shift transmission according to claim 8, wherein the middle axial selection position of the selector sleeve is assigned to middle gear gearwheel pairs.

11. The shift transmission according to claim 8,
   wherein the selector sleeve is axially displaceable under spring-elastic compression of a first coil spring from a middle selection position into a first selection position on the shifting shaft, wherein the first selection position is assigned to first gear gearwheel pairs.

12. The shift transmission according to claim 11,
wherein the selector sleeve is axially displaceable under spring-elastic compression of a second coil spring from the middle selection position into a third selection position on the shifting shaft,
wherein the third selection position is assigned to third gear gearwheel pairs.

13. The shift transmission according to claim 8, wherein the selector lever that is configured to select the gear gearwheel pairs and the shift lever that is configured to engage a gear of the shift transmission are further configured to each cooperate with a cable that transmits shifting forces of a gearshift lever and arranged in a vehicle interior to the shift transmission of the vehicle.

* * * * *